US006981242B2

(12) United States Patent
Lehmeier et al.

(10) Patent No.: US 6,981,242 B2
(45) Date of Patent: Dec. 27, 2005

(54) SYSTEM AND METHOD FOR DEVELOPING CUSTOM OPERATOR-SPECIFIC SOFTWARE-APPLICATIONS

(75) Inventors: Michelle R. Lehmeier, Loveland, CO (US); Robert E. Sobol, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 719 days.

(21) Appl. No.: 10/043,806

(22) Filed: Jan. 11, 2002

(65) Prior Publication Data

US 2003/0132970 A1 Jul. 17, 2003

(51) Int. Cl.[7] .............................................. G06F 9/44
(52) U.S. Cl. ....................... 717/122; 717/120; 707/203
(58) Field of Search ................................ 717/101–103, 717/104, 120–123; 707/203, 204

(56) References Cited

U.S. PATENT DOCUMENTS

| | | | |
|---|---|---|---|
| 5,218,605 A * | 6/1993 | Low et al. .................... | 714/45 |
| 5,774,118 A | 6/1998 | Hatakama | |
| 5,799,292 A | 8/1998 | Hekmatpour | |
| 6,121,968 A | 9/2000 | Arcuri et al. | |
| 6,128,773 A * | 10/2000 | Snider .......................... | 717/132 |
| 6,151,643 A * | 11/2000 | Cheng et al. ................. | 710/36 |
| 6,269,473 B1 * | 7/2001 | Freed et al. ................. | 717/104 |
| 6,330,586 B1 * | 12/2001 | Yates et al. .................. | 709/201 |
| 6,418,554 B1 * | 7/2002 | Delo et al. ................... | 717/174 |
| 6,473,768 B1 * | 10/2002 | Srivastava et al. .......... | 707/101 |
| 6,523,166 B1 * | 2/2003 | Mishra et al. ............... | 717/174 |
| 6,574,791 B1 * | 6/2003 | Gauthier et al. ............. | 717/107 |
| 6,701,515 B1 * | 3/2004 | Wilson et al. ............... | 717/117 |
| 6,745,195 B1 * | 6/2004 | Kornfein et al. ............ | 707/102 |
| 6,754,896 B2 * | 6/2004 | Mishra et al. ............... | 717/176 |

FOREIGN PATENT DOCUMENTS

| | | |
|---|---|---|
| EP | 0 367 709 A1 | 5/1990 |
| EP | 0 617 360 A2 | 9/1994 |
| EP | 0 617 360 A3 | 9/1994 |

OTHER PUBLICATIONS

Barrett et al, "Auromated support for seamless interoperability in polylingual software systems", ACM SIGSOFT, pp 147-155, 1996.*

Pei et al, "A method for mofifying dynamically classes in the object oriented dynamic programming environment", AC<SIGPLAN, vol. 32, No. 9, pp 57-60, Sep. 1997.*

Bihari et al, "Adynamic adaption of real time software", ACM Trans on Compter Sys. vol. 9, No. 2, pp 143-174, May 1991.*

Maruyama et al, "A mechanism for automatically and dynamically changing software components", ACM SSR, pp 169-180, 1997.*

* cited by examiner

*Primary Examiner*—Anil Khatri

(57) ABSTRACT

The present disclosure relates to systems and methods for customizing a software application interface. A method for modifying a software application contains the following steps: identifying the operator; acquiring an operator profile; setting a threshold value; monitoring the operator's use of the software; and modifying a functional interface when the threshold is exceeded.

21 Claims, 9 Drawing Sheets

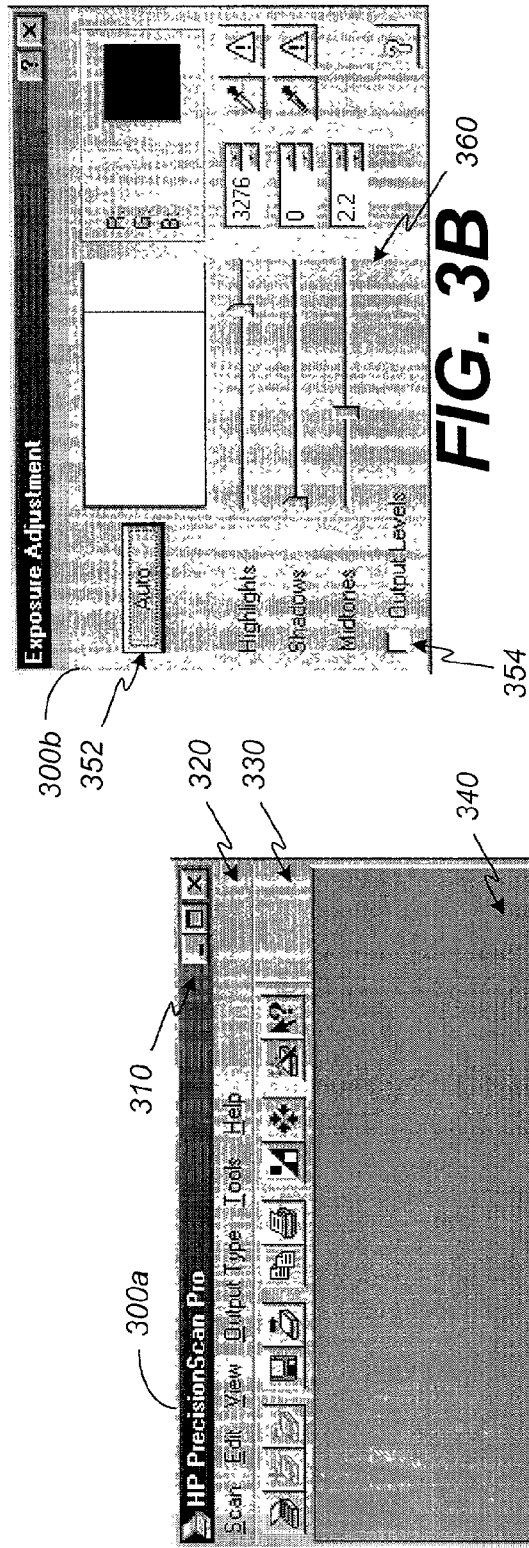
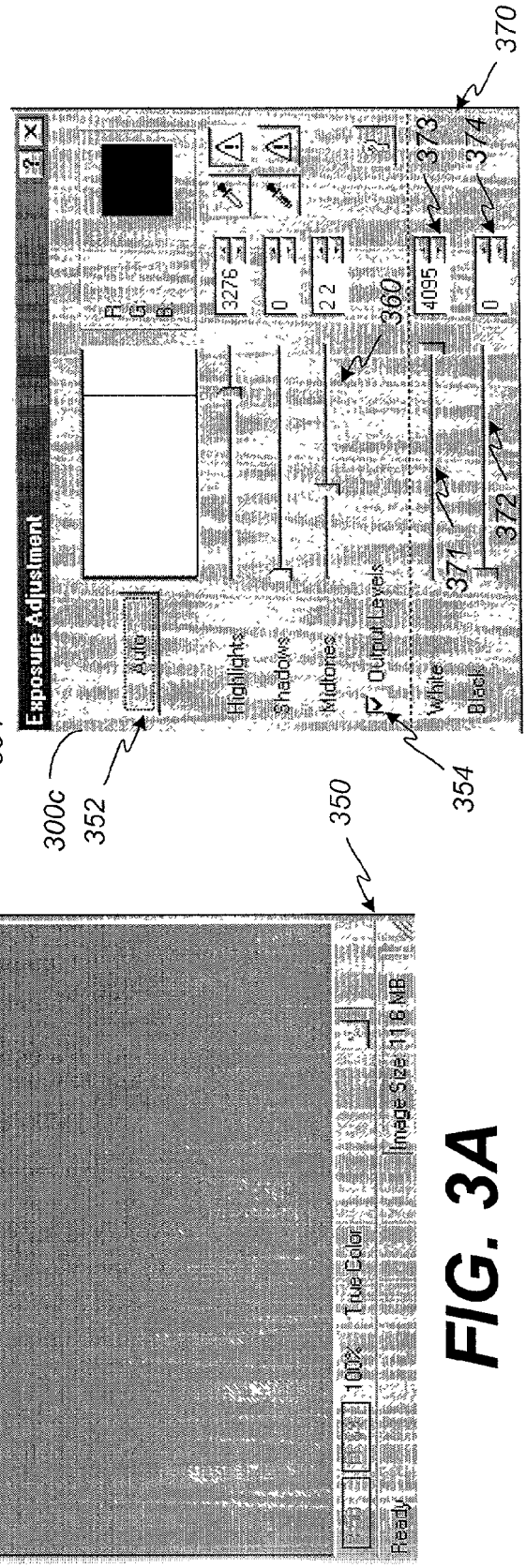

SYSTEM AND METHOD FOR DEVELOPING CUSTOM OPERATOR-SPECIFIC SOFTWARE-APPLICATIONS

FIELD OF THE INVENTION

The present disclosure relates to software. More particularly, a system and method for developing customized software are disclosed.

BACKGROUND OF THE INVENTION

Computing systems may include a variety of software products available from various suppliers. In general, software developers have taken advantage of processing efficiencies and inexpensive memory devices to develop software applications with ever-increasing features and functionality. Many software applications are so feature loaded that new and occasional users of the software are often overwhelmed when they venture into unfamiliar interfaces and attempt to operate the software to its potential. The learning curve associated with learning a new software product becomes more challenging with each larger and more complex version of the product.

Interface standardization is one approach that has been used by software developers to ease new and occasional users of various software applications through their introduction to the application. By developing a specific application with user interfaces that are arranged in a familiar format, software engineers take advantage of efficiencies derived from copying previously programmed interfaces and users are able to produce at least the most basic products possible with the application. Graphical user interfaces having a plurality of pull-down menus have become popular. However, as software applications become more integrated with other software packages and more feature laden over time, it becomes more difficult for occasional and new operators of a particular software application to navigate, locate, and operate new and seldom used functions.

A second approach often used by software developers to generate a more user-friendly software application, is layering the functional interfaces associated with a particular software product such that commonly understood and "simple" functions appear first. In this layering methodology, functions that are more difficult are placed in sub-menus or pop-up interface displays that are activated from the higher level menus. While this layering approach is useful for allowing new and novice users to complete high-level tasks, it does not address the interface navigation and software familiarity problems introduced above.

Some of the problems associated with learning a new software application have been addressed by tutorials and help systems. Generally, tutorials provide a number of serially introduced screens describing a method of using the software to accomplish a specific task. Tutorials, to the extent that they are correct and updated to reflect the operation of the present version of the software can be a useful training tool. However, tutorials do not address the problems encountered by a novice user in navigating and responding appropriately to options presented in multiple menus to complete a specific task.

Similarly, help systems may provide a number of inter-related screens describing operator steps required to complete a task. Help systems typically include a task index of high-level operations that an operator may desire to master, as well as, an index with an associated search utility to permit an operator to locate a description of how to perform both high-level and low-level tasks. While, help systems may assist a novice user in completing one or more tasks, help systems also do not reduce the steps required to successfully navigate and operate complex software interfaces. Because help systems are often generated using the names of underlying objects provided by the various software engineers and developers to identify low-level operations, they are often frustrating to new users who are unfamiliar with the names used by the developers.

Some software developers have added pop-up assistants that are triggered by the location of the cursor on the interface (e.g., in a graphical user interface or GUI). Other pop-up assistants may be triggered by multiple operator inputs that are unsuccessful at initiating an available software function. These assistants try to anticipate what a user may be attempting to accomplish based on the latest user inputs. Frequently, pop-up assistants are not very useful as the novice user is traversing the wrong menu or interface to generate the desired assistant dialogue. Consequently, each feature added with new versions of a software product are likely to add to user frustration in navigating and operating the various interfaces associated with the performance of unfamiliar tasks.

SUMMARY OF THE INVENTION

From the above, it can be appreciated that it would be desirable to have a system and method in which various application interfaces are uniquely modified in response to the usage level and skills of a particular operator. Briefly described, in architecture, a system for developing custom operator-specific software-applications can be implemented with a computing device, an execution memory, an input device, and an output device. The execution memory device may be configured to execute usage monitor logic and skill assessment logic that generates a customized set of interfaces suitable for an identified operator of the underlying software application.

Some embodiments of the system can be viewed as providing a method for modifying a software application. In this regard, the method can be summarized by the following steps: identifying the operator of the software application; acquiring an operator profile associated with the identified operator; setting a threshold value; configuring a functional interface responsive to the operator profile; monitoring the operator's use of the software; and modifying the functional interface when the threshold is exceeded.

BRIEF DESCRIPTION OF THE DRAWINGS

The invention can be better understood with reference to the following drawings. The components in the drawings are not necessarily to scale, emphasis instead is placed upon clearly illustrating the principles of the present invention. Moreover, in the drawings, like reference numerals designate corresponding parts throughout the several views.

FIGS. 3A–3C are a series of schematic diagrams illustrating sample interfaces that may be encountered by an operator of a software application that provides graphical user interfaces (GUIs) and menus.

DETAILED DESCRIPTION

The present disclosure generally relates to system and method for leveraging knowledge and experience regarding an operator's use of a particular software application. Operator-specific information reflective of the operator's identity and usage history is collected and selectively applied to logic suited to modify the look and feel of the underlying software application. Alternatively, if an operator history log is not available, a default configuration may be applied to the modifying logic. A set of skill level and/or usage thresholds may be applied to support the modifying logic.

While the custom operator-specific software-application is illustrated and described herein in association with operation on a generic computing device in communication with a display monitor, it should be appreciated that the improved software application is not limited to operation on a personal computer or workstation. The improved software application may be operable across a broad range of computing devices, such as, but not limited to, personal digital assistants (PDAs), cellular telephones, processor driven appliances, etc. Furthermore, the interfaces described are not limited to GUIs displayed on a display monitor. In addition, it will be appreciated that the improved software application may be operable over a network (e.g., in the form of a web-based application).

Figure 1:
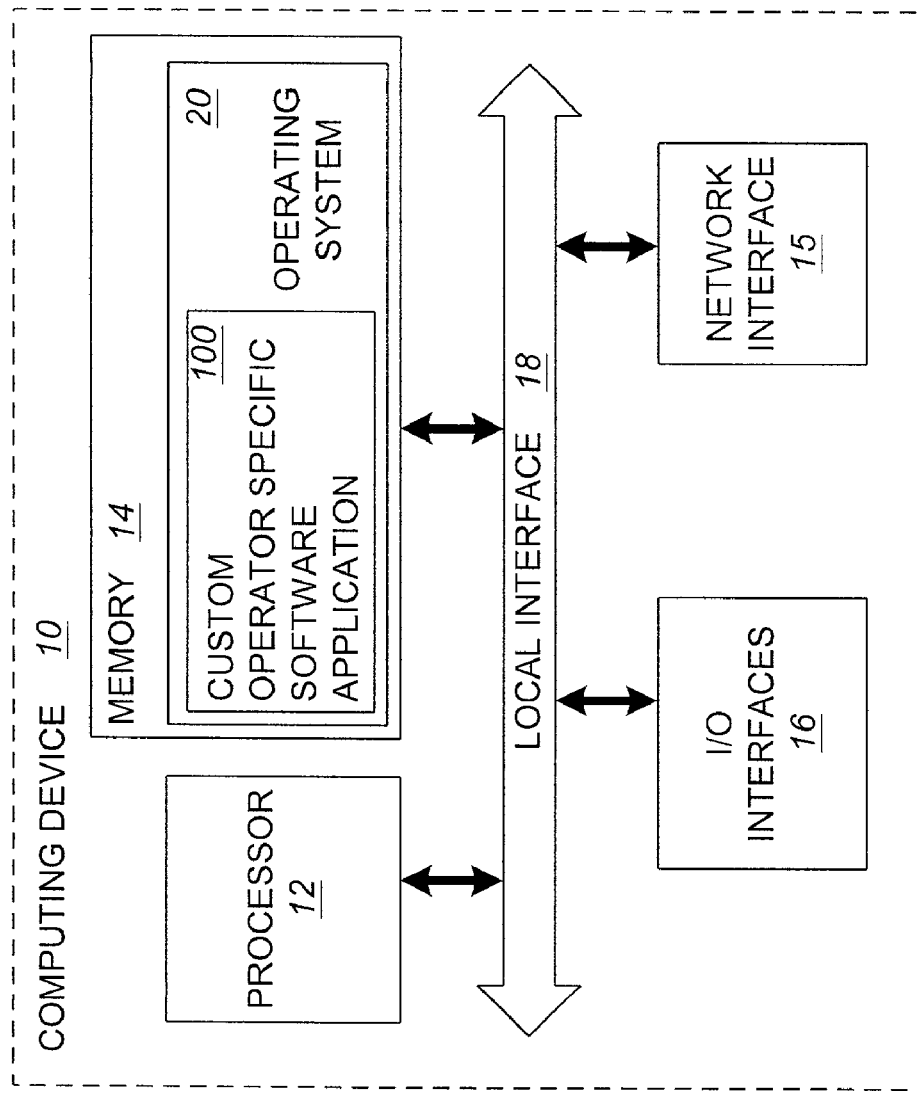
FIG. 1 is a schematic diagram of an embodiment of an exemplar-computing device.

Referring now in more detail to the drawings, in which like numerals indicate corresponding parts throughout the several views, FIG. 1 illustrates a functional block diagram of a computing device. In this regard, FIG. 1 illustrates the various functional blocks associated with a general-purpose computing device 10. The computing device 10 may be configured to store and execute a custom operator-specific software-application 100. Generally, the computing device 10 may include a processor 12, a memory 14, input/output interfaces 16, and a network interface 15 that are connected together and can communicate with each other via a local interface 18. The local interface 18 can be, for example, but not limited to, one or more buses or other wired or wireless connections, as is known in the art. The local interface 18 may have additional elements, which are omitted for simplicity, such as buffers (caches), drivers, and controllers, to enable communications. Further, the local interface 18 includes address, control, and data connections to enable appropriate communications among the aforementioned components.

The processor 12 is a hardware device for executing software that can be stored in the memory 14. The processor 12 can be any custom made or commercially available processor, a central processing unit (CPU) or an auxiliary processor among several processors associated with the computing device 10 including a microchip based microprocessor or a macro-processor. Examples of suitable commercially available microprocessors are as follows: an 80x86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 14 can include any one or a combination of volatile memory elements (e.g., random access memory (RAM), such as dynamic RAM (DRAM), static RAM (SRAM), etc.) and non-volatile memory elements (e.g., read only memory (ROM), hard drive, tape, compact disc-read only memory (CD-ROM), etc.). Moreover, the memory 14 may incorporate electronic, magnetic, optical, and/or other types of storage media. Note that the memory 14 can have a distributed architecture, where various components are situated remote from one another, but can be accessed by the processor 12.

Furthermore, the computing device 10 may be integrated with a host of input and output devices via the I/O interfaces 16. The various I/O devices described below are not illustrated for simplicity of illustration. Input devices may include, but are not limited to, a scanner, a keyboard, a mouse, a touchpad, a touchscreen, or other devices suited for operating an interface. Each of the various input devices may be in communication with the processor 12 and/or the memory 14 via the local interface 18 and the I/O interfaces 16. Output devices may comprise a video signal interface that supplies a video output signal to a display monitor associated with the computing device 10. A host of display monitor types may be associated with the computing device 10. The display monitor can be a conventional CRT based display device. Alternatively, the display monitor can be implemented with other display types, such as a liquid crystal display (LCD) or a plasma display. The output devices may also include a speaker, as well as other well-known devices such as a printer.

It is significant to note that other devices that communicate both inputs and outputs may be in communication with the local interface 18, for instance, but not limited to, a modulator/demodulator (modem; for accessing another device, system, or network), a radio frequency (RF) or other transceiver, a telephonic interface, a bridge, a router, etc. For simplicity of illustration, these aforementioned two-way communication devices are not illustrated.

One such two-way communication device, the network interface 15, can be, for example, a network interface card that connects the computing device 10 to a wide area network (WAN) or a local area network (LAN) (not shown). Alternatively, the network interface 15 could be a modulator/demodulator (i.e., a modem) or any communication device capable of connecting the computing device 10 to the desired network.

The custom operator-specific software-application 100 in memory 14 may include one or more separate programs, each of which comprises an ordered listing of executable instructions for implementing logical functions. In the example of FIG. 1, the software in the memory 14 includes the custom operator-specific software-application (COSSA) 100 and a suitable operating system 20. A non-exhaustive list of examples of suitable commercially available operating systems 20 is as follows: a Windows operating system from Microsoft Corporation, U.S.A., a Netware operating system available from Novell, Inc., U.S.A., or a UNIX operating system, which is available for purchase from many vendors, such as Hewlett-Packard Company, U.S.A. and Sun Microsystems, Inc., U.S.A, and a LINUX operating system available from Redhat, among other vendors. The operating system 20 essentially controls the execution of other computer programs, such as the COSSA 100 and provides scheduling, input-output control, file management, memory management, communication control and related services. The processor 12 and operating system 20 define a computer platform, for which application programs, such as the COSSA 100, may be written in higher level programming languages.

It will be appreciated that software and/or firmware in the memory 14 may further include a basic input output system (BIOS) (not shown). The BIOS is a set of essential software routines that test hardware at startup, start the operating system 20, and support the transfer of data among hardware devices. The BIOS is stored in read-only memory so that it can be executed when the computer and/or image-acquisition device is activated.

When the computing device 10 is in operation, the processor 12 is configured to execute software stored within the memory 14, to communicate data to and from the memory 14, and to generally control operations pursuant to the software. The COSSA 100, other applications, and the operating system 20, in whole or in part, but typically the latter, are read by the processor 12, perhaps buffered within the processor 12, and then executed.

It is significant to note that the COSSA 100 can be implemented in software (e.g., firmware), hardware, or a combination thereof. In the currently contemplated best mode, the COSSA 100 is implemented in software, as an executable program, and is executed by a special or general-purpose computing device 10, such as a personal computer (PC; IBM-compatible, Apple-compatible, or otherwise), workstation, minicomputer, mainframe computer, PDA, processor driven appliance, cell-phone or other similar device as previously described.

The COSSA 100 is a source program, executable program (object code), script, or any other entity comprising a set of instructions. When in the form of a source program, the program needs to be translated via a compiler, assembler, interpreter, or the like, which may or may not be included within the memory 14, so as to operate properly in connection with the operating system 20. Furthermore, the COSSA 100 can be written in (a) an object oriented programming language, which has classes of data and methods, or (b) a procedure programming language, which has routines, subroutines, and/or functions, for example, but not limited to, C, C++, Pascal, Basic, Fortran, Cobol, Perl, Java, and Ada.

When the COSSA 100 is implemented in software, as is shown in FIG. 1, it should be noted that the COSSA 100 can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The COSSA 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a ROM (electronic), an erasable programmable read-only memory (EPROM, EEPROM, or Flash memory) (electronic), an optical fiber (optical), and a portable compact disc (CD) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

If implemented solely in hardware, as in an alternative embodiment, the COSSA 100 can be implemented with any or a combination of the following technologies, which are all well known in the art: a discrete logic circuit(s) having logic gates for implementing logic functions upon data signals, an application specific integrated circuit (ASIC) having appropriate combinational-logic gates, a programmable gate array(s) (PGA), a field programmable gate array (FPGA), etc.

Figure 2:
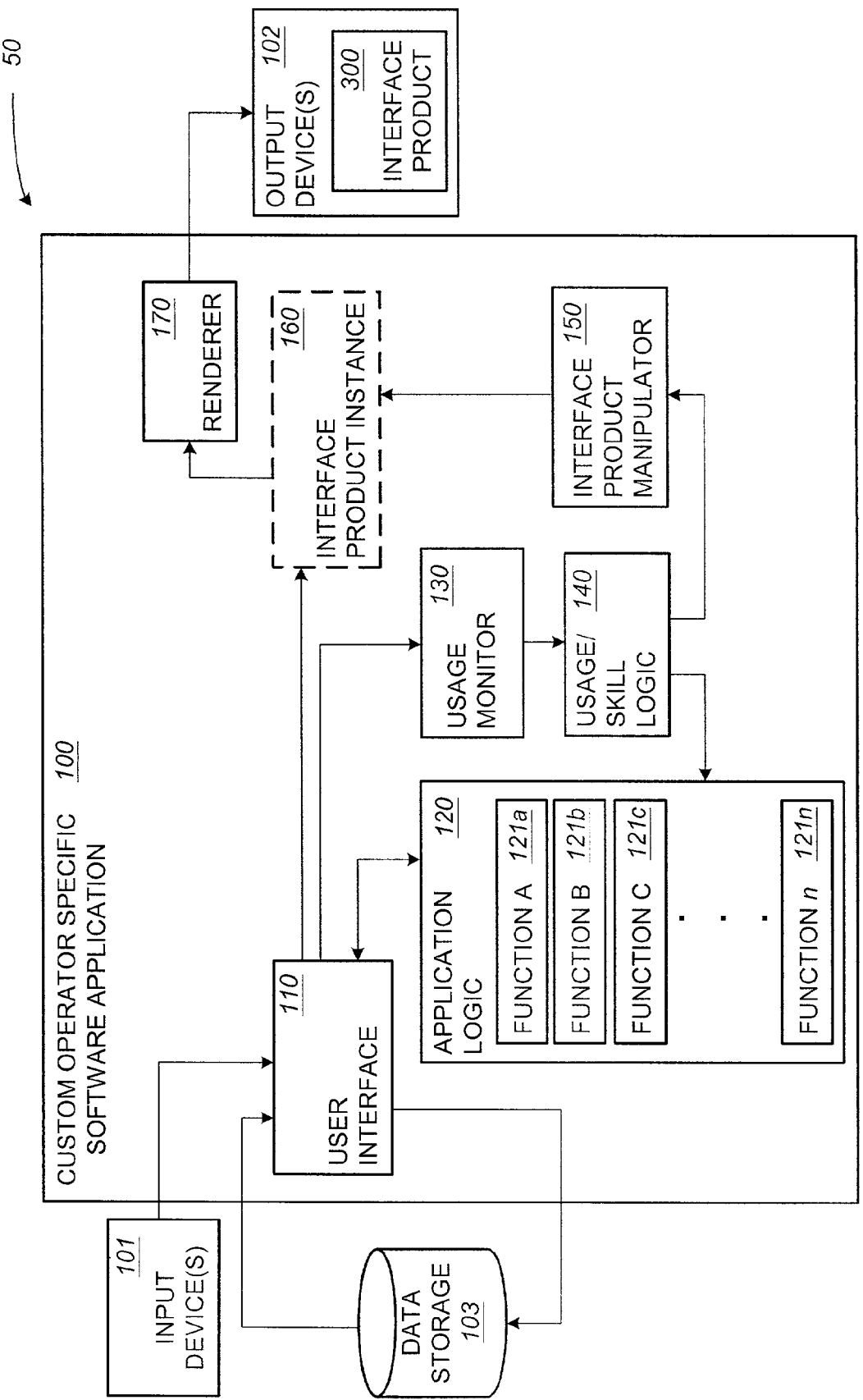
FIG. 2 is a schematic diagram of a sample custom operator-specific software-application system that may be operated on the computing device of FIG. 1.

Custom Operator-Specific Software-Application (COSSA) Architecture and Operation Reference is now directed to FIG. 2, which presents a functional block diagram illustrating a COSSA system 50 that may be implemented within the computing device 10 of FIG. 1. As illustrated in FIG. 2, the COSSA system 50 may be implemented by the COSSA 100 in communication with an input device(s) 101, an output device(s) 102, and a data storage device 103. As shown in the block diagram of FIG. 2, the COSSA 100 may contain a user interface 110, application logic 120, a usage monitor 130, usage/skill logic 140, and an interface-product manipulator 150. As further illustrated in FIG. 2, the COSSA 100 may also contain a renderer 170 configured to prepare an interface-product instance 160 for delivery to the one or more output devices 102. As is also shown, an observable interface product 300 may be generated by the one or more output devices 102.

As illustrated in the block diagram of FIG. 2, the user interface 110 is in communication with the input device(s) 101, the data storage device 103, the application logic 120, and the usage monitor 130. As further illustrated in FIG. 2, the user interface 110 and application logic 120 may combine to form an interface product instance 160. The interface product instance 160 is a digital representation of the information that is contained within an interface product 300. It will be appreciated that the interface product 300 may contain various information related to the underlying application logic 120. For example, when the application logic 120 is a digital-imaging acquisition engine, the interface product 300 may contain a plurality of GUIs designed to permit an operator of the COSSA 100 to control an external (to the computing device 10) scanner through data acquisition, area selection, image resizing (optional), image adjustment (optional), selecting an output type and device, and the step of digital-image delivery.

The user interface 110 consists of a plurality of data entry windows or frames that may be presented to an operator of the COSSA 100. Preferably, the user interface 110 is in the form of a plurality of GUIs presented under a standard human machine interface easily recognizable and operable by both novice and expert operators of the COSSA 100. For example, the user interface 110 may take the form of a plurality of application windows each configured with a menu bar and a command bar containing one or more file command push-buttons, and one or more function pushbuttons. The menu bar, command bar, file command push-buttons, and function pushbuttons may be selectively oper ated by a host of input devices 101. Some exemplary input devices 101 may include a keyboard, a mouse, a trackball, a light pen, a touch screen display, etc.

As shown in the functional block diagram of FIG. 2, the user interface 110 may be configured to operate in association with the application logic 120, the usage monitor 130 and the usage/skill logic 140 to monitor an operator's activities during each subsequent active session. The application logic 120, as illustrated in the functional block diagram of FIG. 2, may contain a plurality of functions specific to the particular tasks designated for the COSSA 100. The illustration presents functions 121a–121n, labeled Function A, Function B, Function C, . . . , Function n. The functions 121 will vary depending upon the purpose of the COSSA 100. For example, when the COSSA 100 is a word processor, the functions 121 may include delete, copy, paste, find, replace, format, undo, among many others. When the COSSA 100 is an image-acquisition engine, the functions 121 may include, preview, output type selection, copy, resolution, sharpness, color adjustment, black and white threshold adjustment, etc.

In addition to the application logic 120, the user interface 110 may be in communication with an operator database that may be stored and retrieved from the data storage device 103. The operator database may contain an operator profile for each operator of the COSSA 100. The operator database may contain a history log of each operator's activities within the COSSA 100. For example, the operator database may contain information reflective of an operator's use of a particular function. The digital-imaging acquisition engine may be associated with an operator database that records the operator's use of a color adjustment function. The operator database may be configured to record separate instances of operator requests for the COSSA 100 to perform individual tasks, such as adjusting the hue of green tones or the brightness of an image. Alternatively, and/or additionally, the operator database may be programmed to group tasks associated with a higher level operation. For example, an image brightness adjustment group may include the following image editing selections: adjusting highlights, shadows, mid-tones; adjusting maximum and minimum brightness levels for a portion of the image; and adjusting the maximum and minimum brightness levels for the entire image. Similarly, a color adjustment group may record operator selections related to hue and color saturation adjustments.

Furthermore, the user interface 110 may be configured to communicate with the usage monitor 130 and the usage/skill logic 140. The usage monitor 130 is in communication with the operator database via the user interface 110 and may be programmed to observe each instance when an identified operator selects an available function 121. In accordance with a first operational mode of the COSSA 100, the usage monitor 130 is programmed to observe the number of instances that an operator selects a particular functional and compares the sum of the observed instances with a pre-determined threshold associated with the function. The pre-determined threshold may be set in accordance with feedback derived from operator satisfaction surveys and/or other information indicative of when an operator has reached a level of familiarity with the functions and operations of the COSSA 100. For example, customer satisfaction surveys may indicate that operators introduced to an image-acquisition device and the associated software are generally comfortable with the operation of the color adjustment interface after having scanned and edited N color photographs. Consequently, the usage monitor 130 may be programmed to communicate (e.g., by using a counter) when an operator has met or exceeded his Nth color image edit to the interface product manipulator 150. As shown in FIG. 2, the usage monitor output may be routed to the interface-product manipulator 150 via usage/skill logic 140.

In accordance with a second operational mode of the COSSA 100, an operator profile containing information indicative of the present operator's skill level may be forwarded by the user interface 110 to the usage/skill logic 140. The usage/skill logic 140 may use the operator profile information to generate one or more inputs designated for further processing by the interface-product manipulator 150. In this second operational mode, the usage/skill logic 140 may analyze a number of different historical indicators in determining an overall operator-skill score. Generally, the skill score may be used by the usage/skill logic 140 as an indicator of when a particular operator of the COSSA 100 has illustrated an operational proficiency with the present application interface(s). It should be appreciated that the overall operator skill score may define multiple skill grades or levels each associated with a corresponding level of proficiency with the application.

Regardless of the operational mode, the COSSA 100, as illustrated in the functional block diagram of FIG. 2, may be programmed to apply the informational inputs from the usage monitor 130 and the usage/skill logic 140 to the interface-product manipulator 150. In response to the various inputs, the interface-product manipulator 150 may be programmed to modify the look and feel of the COSSA 100 interfaces. Modifications of the COSSA 100 may include adding more sophisticated user tools, enabling a set of manual adjustments where software automatically adjusted various parameters in previous presentations of the COSSA 100, moving a seldom used feature to a pull-down menu, as well as, in some cases moving and/or removing irrelevant or rarely used functional offerings from higher-levels of the user interface. Moreover, modifications to the COSSA 100 may include moving a commonly used GUI that was previously initiated by a menu selection to a floating dialogue box and/or adding a function pushbutton to a higher-level GUI.

The COSSA 100 in preferred embodiments is programmed to provide a standard computer interface commonly used with popular word-processing programs. Included therein are several functional items that are defined below:

Context-Sensitive Menu—A menu that highlights options as available or unavailable depending upon the context in which the menu is called.

Drop Down Menu—Drops down from menu bar and remains active until closed or an available menu option is selected.

Menu Bar—Bar across top of screen that contains one or more labels which activate an associated drop down menu.

Pull Down Menu—A sub-menu that is typically activated by moving a pointing device over a drop down menu option.

Pop-up Menu—Menu that is activated upon selection of a feature push-button.

Scroll Bar—Bar at side or bottom of screen that allows user to scroll left, right, and/or up, and down through a large window.

As further illustrated in FIG. 2, the interface-product manipulator 150 and the user interface 110 may separately generate an interface-product instance 160 responsive to the present configuration of the functional interfaces of the COSSA 100. It should be appreciated that the interface-product instance 160 represents the integration of operator-specific interfaces and functions selected in accordance with information supplied by the operator database and a set of rules applied in the usage monitor 130 and the usage/skill logic 140 as interpreted by the interface-product manipulator 150. Alternatively, the interface-product instance 160 may represent standard novice-level interfaces as provided by the user interface 110 in cooperation with the application logic 120.

Regardless of the source of the information provided, the interface-product instance 160, as shown in FIG. 2, is forwarded to the renderer 170, which is configured to generate an appropriate representation of the underlying information in response to the particular output device 102 used by the operator. Preferably, the renderer 170 is configured to selectively interface with a plurality of output devices 102 each capable of generating an observable rendition of the interface product 300. For example, in one embodiment, the renderer 170 may be configured to interface with a display monitor that may be viewed by an operator. In an alternative embodiment, the renderer 170 may be programmed to forward the interface product 300 to a printer in communication with the computing device 10 (FIG. 1).

It should be appreciated that once the interface product 300 is available in buffers associated with other suitable applications, the interface product 300 can be copied, transmitted, and processed by other computing devices and is no longer dependent upon the COSSA 100. For example, if the interface product 300 is present within an integrated application on a computing device 10 associated with a LAN, the interface product 300 may be stored, faxed, displayed, electronically mailed, and/or printed by commands generated within the associated computing device. Once the interface product 300 has been stored on a networked device (i.e., a computing device on a LAN or a WAN), the interface product 300 may be available to operators granted access authority.

Reference is now directed to FIGS. 3A–3C. FIGS. 3A–3C are a series of exemplar schematic diagrams illustrating interfaces that may be encountered by an operator of a software application that provides menu based GUIs. A first application window 300a, labeled, "HP PrecisionScan Pro" may present window-level functional pushbuttons (three illustrated) in a window-level interface 310. In this regard, the window-level interface may contain a "minimize," "restore," and "terminate window" functional pushbuttons. It will be appreciated that an operator of the HP PrecisionScan Pro software product may minimize, restore, and/or terminate the application window by locating a cursor indicative of the position of an input pointing device over the pushbutton related to the desired function and by initiating an input indicative of selecting the function.

The first application window 300a may also provide a pop-up menu bar 320, a functional command input bar 330, a data display 340, and a status bar 350. As shown in FIG. 3A, the pop-up menu bar 320 may include multiple menu labels identified as "Scan," "Edit," "View," "Output Type," "Tools," and "Help." Each menu label is associated with an underlying functional menu that may be actively displayed in response to an operator adjusting a cursor to coincide with the label on the first application window 300a. Each of the underlying functions may then be activated by readjusting the cursor to coincide with a desired function and initiating an input indicative of selecting the function. Also shown in FIG. 3A is an exemplar functional command input bar 330 populated by a number of icon-labeled functional pushbuttons (eleven shown). Each of the icon-labeled functional pushbuttons may be associated with a function or a string of several functions in order to complete a particular task.

The data display 340 is programmed to generate a rendition of a scanned or previewed source that is placed on the platen of an associated scanner. In this regard, the rendition is a recreation of the source based on buffered data collected and stored as a scanning sensor traversed the platen. The status bar 350 is presented along the lower edge of the interface and contains information reflective of the size of the source, the scan resolution, the scan type, scanner status, and an indication of the size of the digital image that the scanner application software will create with the present operational settings.

FIG. 3B presents a second application window 300b that may be presented to an operator of the first application window 300a when an operator selects an exposure adjustment tool option from the Tools pop-up menu. The second application window 300b contains a functional push-button 352, labeled, "Auto" that may be pre-programmed to adjust each of the available image editing parameters associated with the present image type. For example, when an operator of the second application window 300b selects the "Auto" function by placing a cursor indicative of the position of a pointing device over the button and initiating an input indicative of selecting the function, the Highlights parameter may be automatically set to its maximum brightness value, the Shadows parameter may be set to its minimum brightness value, and the Mid-tones parameter may be set to a mid-range value.

As illustrated, the second application window 300b may contain a plurality of operator-adjustable image-editing parameters 360. Moreover, multiple controls may be associated with each of the image-editing parameters. For example, an operator of the HP PrecisionScan Pro application may adjust a Highlight brightness level by manipulating a representation of a mechanism along a horizontal slot reflective of the range of the parameter. In addition, an operator of the HP PrecisionScan Pro application may adjust the brightness level of the image highlights by entering a numeric value in a data-entry display immediately to the right of the associated slot mechanism. Furthermore, up and down arrow pushbuttons may be associated with the data-entry display window to permit an operator to step through the adjustment range.

The second application window 300b may also contain a functional interface-extension check box 354. In the exemplar application window presented in FIG. 3B, the functional extension is labeled, "Output Levels." When an operator of the second application window 300b activates the functional interface-extension check box 354, the operator is presented with a third application window 300c as illustrated in FIG. 3C. As is shown in FIG. 3C, the upper three-fourths of the third application window 300c is a replica of the second application window 300b of FIG. 3B. The lower one-fourth of the third application window 300c contains further functionality associated with the overriding function of exposure adjustment. As shown in FIG. 3C, the additional functionality is in the form of a level-adjustment extension 370 containing a White-level adjustment and a Black-level adjustment. The White-level adjustment contains both a horizontal slide adjuster 371 as well as a composite data display with up and down arrow pushbuttons 373. Similarly, the Black-level adjustment contains both a horizontal slide adjuster 371 as well as a composite data display with up and down arrow pushbuttons 373. It will be appreciated that a more skilled operator of the first application window 300a of FIG. 3A is required to enter multiple inputs in order to reach the functionality provided in the level adjustment extension 370 presented in the third application window 300c.

Figure 3D:
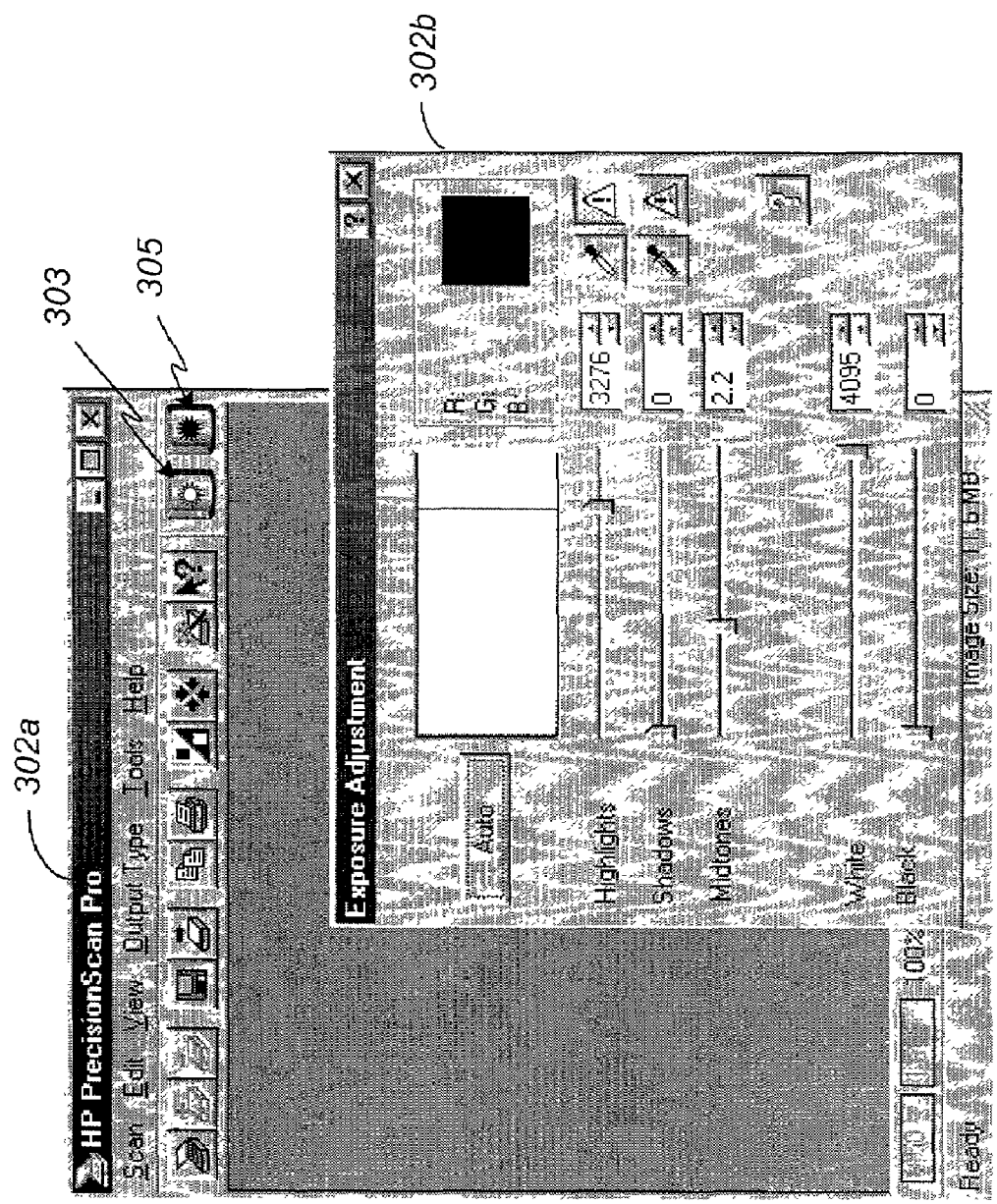
FIG. 3D is a schematic diagram of an exemplar output-device rendition that may be generated by the custom operator-specific software-application of FIG. 2.

As previously described in relation to the COSSA 100 of FIG. 2, the COSSA 100 may be programmed to recognize a more skilled operator of the COSSA 100 and adjust the look and feel of the underlying functional interfaces accordingly. In the present example, where the COSSA 100 takes the form of a digital-image acquisition engine, the COSSA may be programmed to present the modified application window 302a and a dialogue window 302b as illustrated in FIG. 3D. In the schematic of FIG. 3D the dialogue window 302b is shown active and overlapping the presentation of the modified application window 302a. A host of other relational arrangements of the dialogue window 302b to the modified application window 302a are possible including arrangements on a display device where the dialogue window 302b does not overlap the modified application window 302a.

It is important to note that the COSSA 100 may initiate the interface modification because of the operator reaching or exceeding a pre-determined usage threshold. Alternatively, the COSSA 100 may initiate the interface modification when an operator has attained a pre-determined skill score as previously described.

The schematic diagram illustrated in FIG. 3D presents a number of modifications to the overall functional interface. In this regard, a modified first application window 302a contains all of the features, menus, labels, etc. presented in the unmodified first application window 300a of FIG. 3A with addition functional pushbuttons. As illustrated in FIG. 3D, the modified first application window may contain a white level adjustment pushbutton 303 and a black level adjustment pushbutton 305. In the present example, the additional pushbuttons do not complete a functional task, but result in the activation of a dialogue window 302b that may be programmed to remain on the display for as long as the operator desires the dialogue window 302b. In this example, the functional interface-extension check box 354 (FIG. 3B) is no longer present and the dialogue window 302b contains the level adjustment extension 370 of FIG. 3C with its associated functions.

Figure 4A:
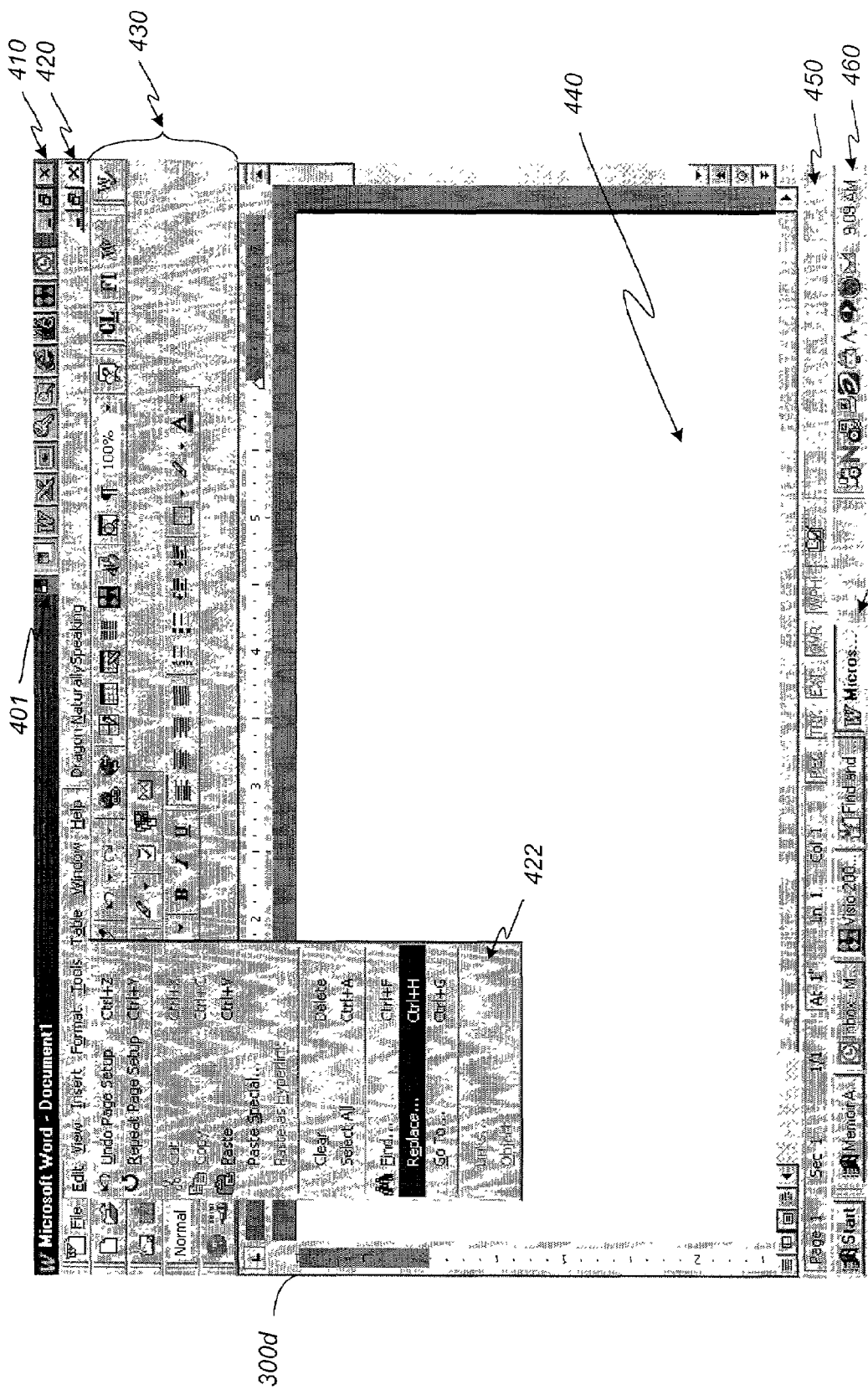
FIGS. 4A–4C are a series of schematic diagrams illustrating sample interfaces that may be encountered by an operator of a software application that provides GUIs and menus.

Reference is now directed to FIG. 4A which presents a schematic diagram illustrating an exemplar interface that may be encountered by an operator of a software application that provides a GUI and menus. A fourth application window 300d, labeled "Microsoft Word—Document1" may present window-level functional pushbuttons (three illustrated) in a window-level interface 410. In this regard, the window-level interface may contain a "minimize," "restore," and "terminate window" functional pushbuttons. It will be appreciated that an operator of the word processor software product may minimize, restore, and/or terminate the fourth application window 300d by locating a cursor indicative of the position of an input-pointing device over the pushbutton related to the desired function and by initiating an input indicative of selecting the function.

The fourth application window 300d, as illustrated in the schematic of FIG. 4A may be superseded by a desktop start menu 401 applied in the present example across the upper edge of the fourth application window 300d. As illustrated the fourth application window 300d may also present a pop-up menu bar 420, a functional command input bar 430, a data display 440, a status bar 450, a hidden-software window bar 455, and an active software status bar 460. As shown in FIG. 4A, the pop-up menu bar 420 may include multiple menu labels identified as "File," "Edit," "View," "Insert," "Format," "Tools," "Table," "Window," and "Help." In addition, the pop-up menu bar 420 may include a menu item for extensions, such as, but not limited to, the extension labeled, "Dragon Naturally Speaking." Moreover, the pop-up menu bar 420 may also include data-display level "minimize," "restore," and "terminate window" functional pushbuttons.

Each menu label within the pop-up menu bar 420 is associated with an underlying functional menu that may be actively displayed in response to an operator adjusting a cursor to coincide with the label on the fourth application window 300d. Each of the underlying functions may then be activated by readjusting the cursor to coincide with a desired function and initiating an input indicative of selecting the function. Also shown in FIG. 4A is an exemplar functional command input bar area 430 populated by a number of icon-labeled functional pushbuttons. Each of the icon-labeled functional pushbuttons may be associated with a function or a string of several functions in order to complete a particular task.

The data display 440 is programmed to generate a rendition of a document as it is being generated by an operator of the underlying word processor. The status bar 450 is presented along the lower edge of the data display 440 and contains information reflective of the present page, section, total pages in the document, cursor position, and active/inactive status of various operational modes. The hidden-software window bar 455 contains a set of pushbuttons programmed to restore application windows associated with other operative but presently inactive software applications. The active software status bar 460 contains a set of icons associated with software applications that are presently operative but because of the their low-level nature do not require a functional interface. In this regard, the active software status bar 460 provides an interface for an operator to selectively terminate these background applications.

Also illustrated in the schematic of FIG. 4A is an exemplar pop-up menu 422 that may be presented in response to an operator of the word processor activating the "Edit" pop-up menu option. As shown, the pop-up menu 422 contains a number of edit functions with some of the various functions presently inactive.

Figure 4B:
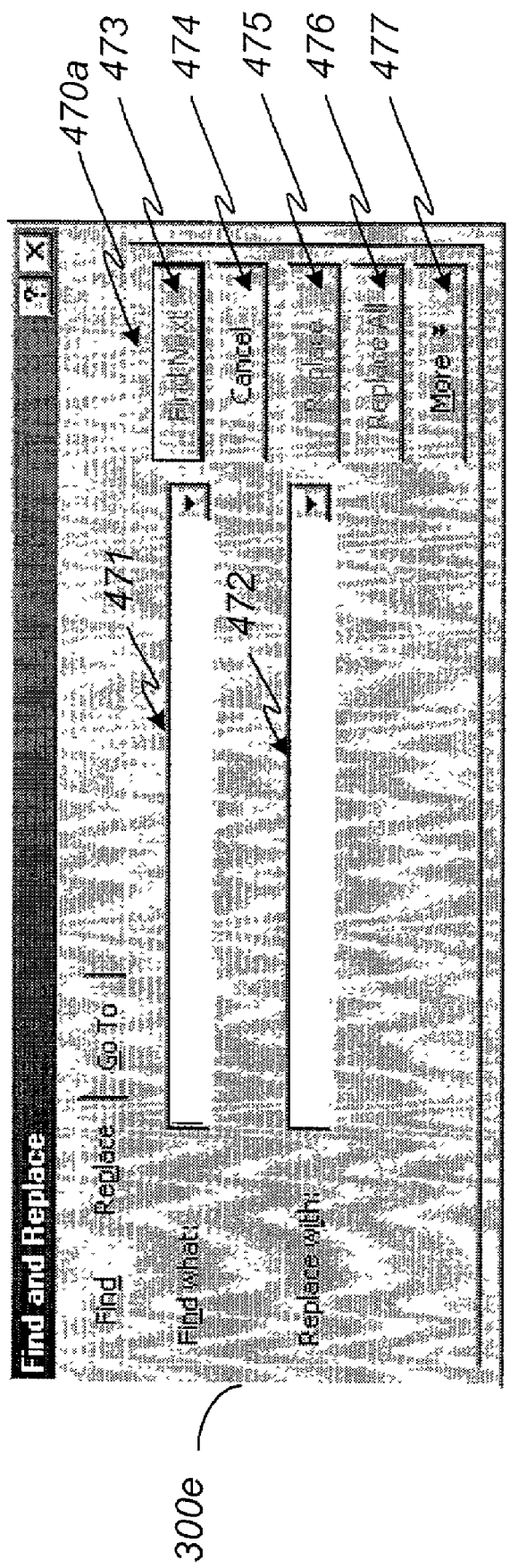

FIG. 4B presents a fifth application window 300e that may be presented to an operator of the fourth application window 300d when an operator selects the "Replace" edit option from the "Edit" pop-up menu. The fifth application window 300e contains an interface page 470a, labeled, "Replace" having a Find data entry and display interface 471, a Replace data entry and display interface 472 and a host of functional pushbuttons 473–477. As further illustrated in the schematic of FIG. 4B, the "Replace" page 470a may be programmed to present a "Find Next," "Cancel," "Replace," "Replace All," and "More" functional pushbuttons 473–477, respectively.

It will be appreciated that the "Find Next" functional pushbutton 473 may initiate a search of the data display 440 (FIG. 4A) to locate the next instance of a data string entered by an operator in the Find data entry and display interface 471. The "Cancel" functional pushbutton 474 may be programmed to terminate the fifth application window 300e. The "Replace" functional pushbutton 475 may initiate a series of commands that delete the data string entered by an operator in the Find data entry and display interface 471 and place the data string entered by an operator in the Replace data entry and display interface 473. The "Replace All" functional pushbutton 476 may initiate a series of commands that delete each occurrence of the data string entered by an operator in the Find data entry and display interface 471 and places the data string entered by an operator in the Replace data entry and display interface 473 at each of the Find data strings locations in the document. The "More" functional pushbutton 477 may add optional functions to the interface presented via the fifth application window 300e to create a sixth application window 300f.

Figure 4C:
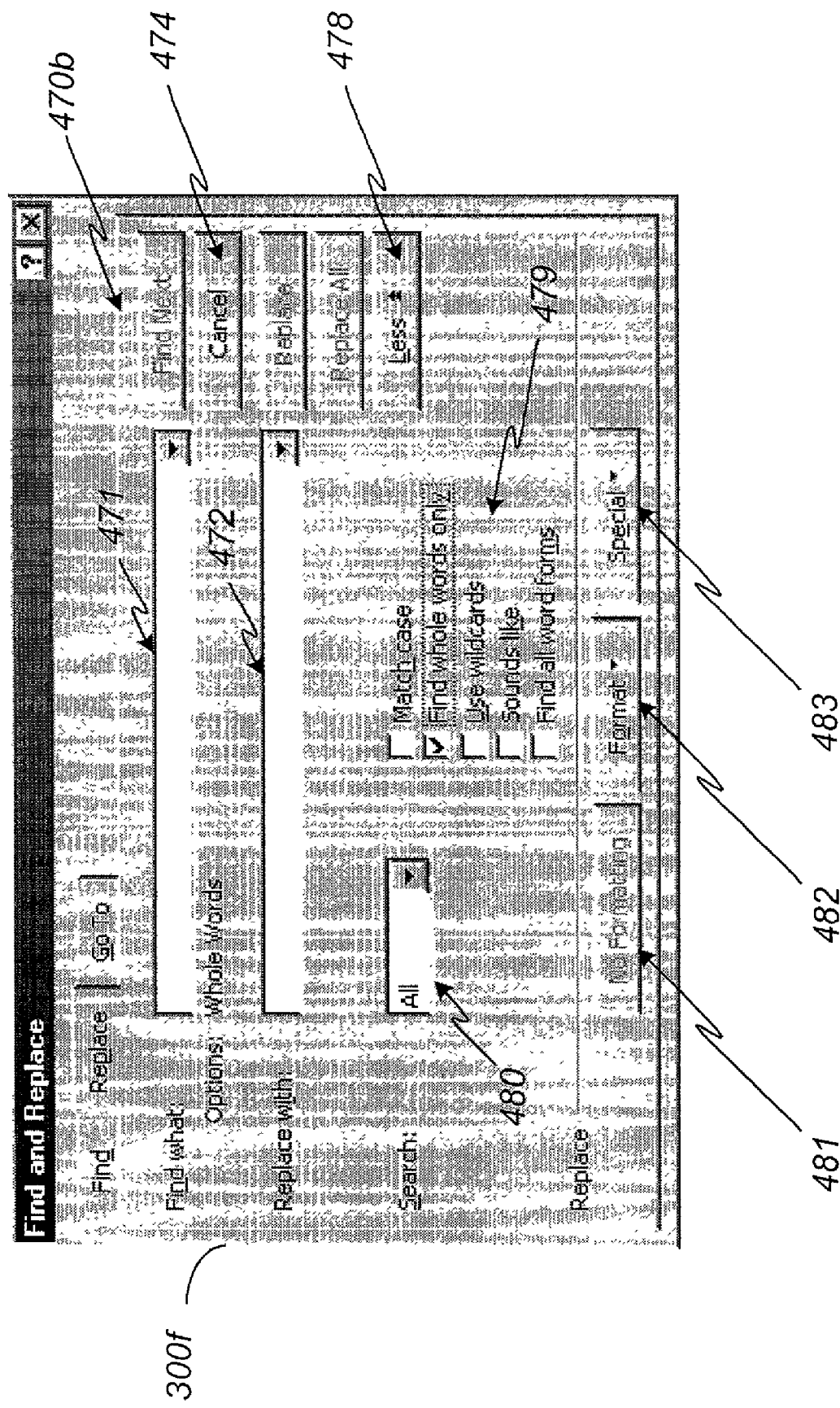

As illustrated in FIG. 4C, the sixth application window 300f may contain all the functionality offered in the fifth application window 300e along with a plurality of functional check boxes 479, a search data entry and display field 480, as well as, "No Formatting," "Format," and "Special" functional pushbuttons. For those operators that do not require the additional functions provided by the sixth application window 300f, the sixth application window 330f contains a "Less" functional push-button 478 that replaced the "More" functional pushbutton 477 of FIG. 4B. It will be appreciated that the "Less" functional pushbutton 478 will return the operator to the fifth interface window 300e of FIG. 4B. It will be appreciated that a more skilled operator of the fourth application window 300d of FIG. 4A is required to enter multiple inputs in order to reach the functionality provided in the functional check boxes 479.

As previously described in relation to the COSSA 100 of FIG. 2, the COSSA 100 may be programmed to recognize a more skilled operator of the COSSA 100 and adjust the look and feel of the underlying functional interfaces accordingly. For example, this recognition may occur in response to one or more parameters stored in a user-specific configuration file, a user-specific operations log, among others. In other embodiments, a skilled user new to an individual workstation may be presented an interface identifying his particular skill level to the COSSA 100. Individual skill levels may be determined after the user responds to a series of associated queries generated to address the user's skill concerning particular functional aspects of the COSSA 100. In still other embodiments, a user of the COSSA 100 may identify his personal skill level by entering a skill level in an interface configured for this purpose. Otherwise, a novice user of the COSSA 100 who uses the application over time and for various purposes may eventually exceed one or more thresholds (i.e., by performing various functions) set to indicate when a typical novice user is experienced with the application. In turn, one or more interfaces and/or functions may be adjusted accordingly. Note that some user interfaces may have several levels of complexity with each associated with a corresponding comfort and/or experience level.

Figure 4D:
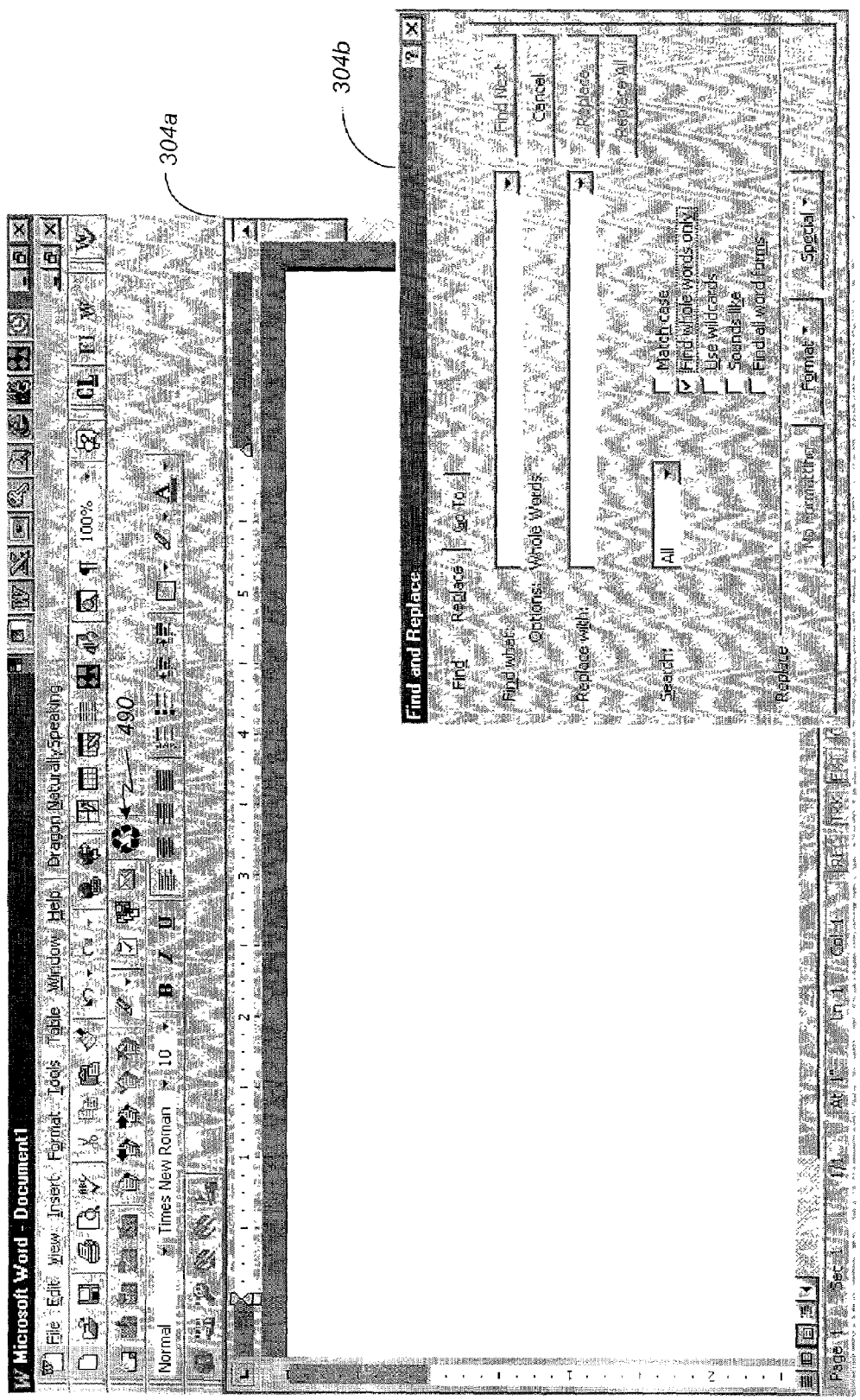
FIG. 4D is a schematic diagram of an exemplar output-device rendition that may be generated by the custom operator-specific software-application of FIG. 2.

In the present example, where the COSSA 100 takes the form of a word processor, the COSSA 100 may be programmed to present the modified application window 304a and a dialogue window 304b as illustrated in FIG. 4D. In the schematic of FIG. 4D the dialogue window 304b is shown active and overlapping the presentation of the modified application window 304a. A host of other relational arrangements of the dialogue window 304b to the modified application window 304a are possible including arrangements on a display device where the dialogue window 304b does not overlap the modified application window 304a.

It is important to note that the COSSA 100 may initiate the interface modification because of the operator reaching or exceeding a pre-determined functional usage threshold. Alternatively, the COSSA 100 may initiate the interface modification when an operator has attained a pre-determined skill score as previously described.

The schematic diagram illustrated in FIG. 4D presents a number of modifications to the overall functional interface. In this regard, a modified fourth application window 304a contains all of the features, menus, labels, etc. presented in the unmodified fourth application window 300d of FIG. 4A with additional functional pushbuttons. As illustrated in FIG. 4D, the modified fourth application window 304a may contain a replace function pushbutton 490, herein labeled, with an icon.

In the present example, the additional pushbutton 490 does not complete a functional task, but results in the activation of the dialogue window 304b that may be programmed to remain on the display for as long as the operator desires the dialogue window 304b. In this example, the "Less" function pushbutton 478 (FIG. 4C) is no longer present and the dialogue window 304b contains all the associated functions introduced in the sixth application window responsive to an operator selection of the "More" function pushbutton 477 of the interface of FIG. 4B.

It should be appreciated that the COSSA 100 is not limited to operation with an image-acquisition device engine (FIGS. 3A–3D) nor a word-processor software-application (FIGS. 4A–4D) and may be integrated with a plethora of software applications. Nor is the COSSA 100 limited to modifying interfaces. For example, operator skill scores could be used by the COSSA 100 to select functionality that is held in reserve and not presented to novice users of a software application. It should be further appreciated that the both the look and feel of the interfaces as well as the functionality associated with a particular software application may be modified at several stages of operator maturity as measured by the operator's associated skill score.

Figure 5:
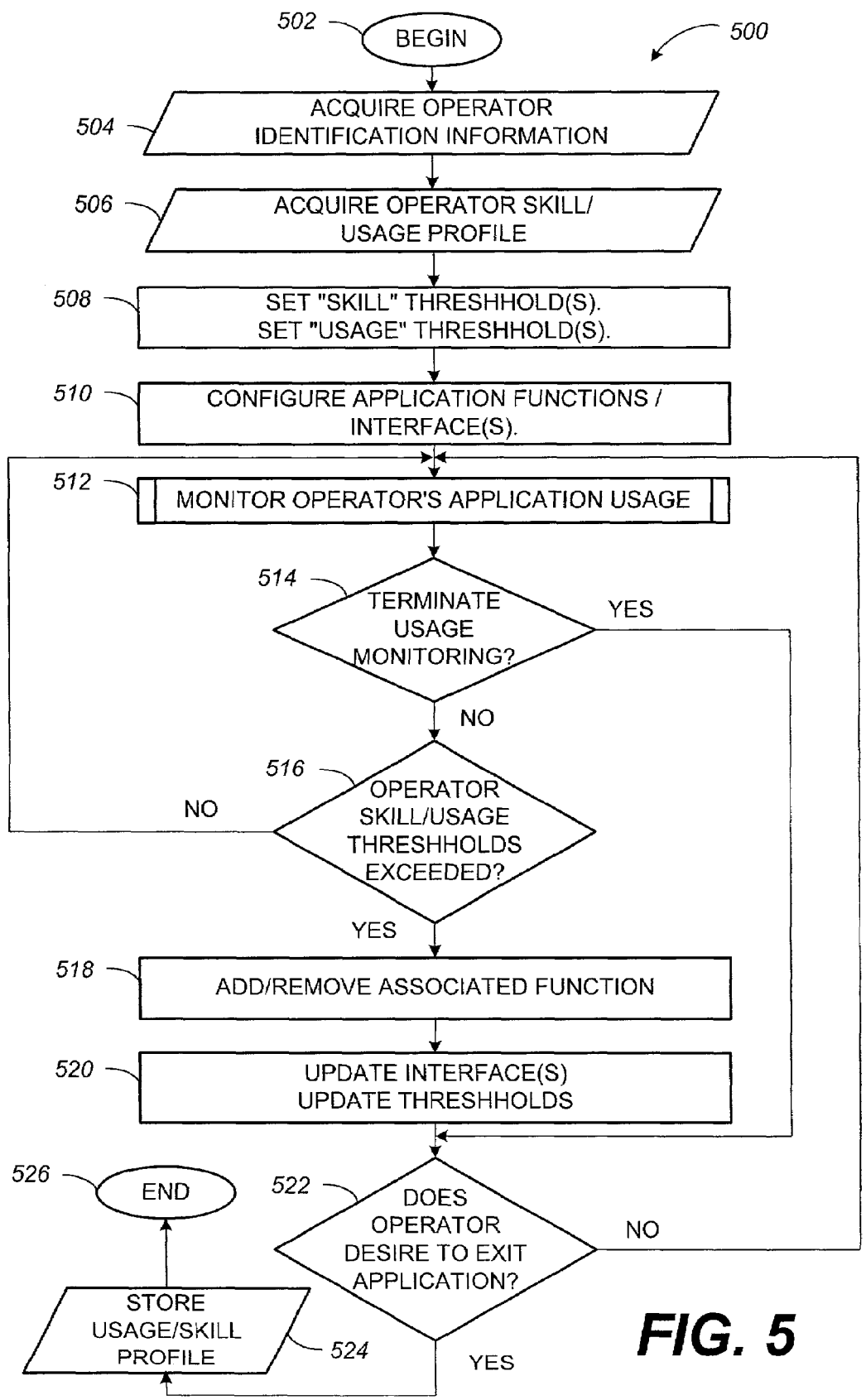
FIG. 5 is a flow chart illustrating a method for modifying a software application that may be practiced by the computing device of FIG. 1 executing the custom operator-specific software-application of FIG. 2.

Reference is now directed to FIG. 5, which presents a flow chart illustrating a method for modifying a software application that may be practiced by the COSSA 100 of FIG. 2. In this regard, the method for modifying a software application 500 may begin with step 502, labeled "Begin." First, as shown in step 504, the COSSA 100 may be programmed to acquire information reflective of the identity of the present operator of the underlying software application. It should be appreciated that the COSSA 100 may actively prompt the operator or may simply retrieve the information of the operating system 20 (FIG. 1). Next, the COSSA 100 may be programmed to acquire information regarding the skill level or usage profile of the identified operator as illustrated in step 506. For example, the COSSA 100 may collect and store information regarding the number of times an operator selects a particular function, a particular interface, or overrides an automated operation. This history log may be applied and compared to a standard determined to reflect an operator's comfort with the application interfaces and their operation. Furthermore, an operator-specific composite-skill score can be developed by weighting history log entries reflective of the operator's usage of the software application over time.

As illustrated in step 508, the COSSA 100 maybe programmed to retrieve various skill level and/or usage thresholds that may be applied to later comparisons. Next, in step 510, the underlying software application maybe initialized and various interfaces and functions may be configured in response to the present operator profile. As shown in step 512, the COSSA 100 is programmed to monitor an operator's use of the software functions for the duration of the session. Next, as illustrated in the query of step 514, the COSSA 100 may check to see if one or more indicators show that usage monitoring should be terminated. When it is the case that usage monitoring should be stopped as indicated by the affirmative-response flow-control arrow exiting the query of step 514, steps 516 through 520 may be bypassed.

Periodically, the COSSA 100 may examine the operator's present skill/usage level by performing the query of step 516. As illustrated by the negative-response flow-control arrow, if the operator has not reached the requisite level to trigger a modification of the software, steps 512 through 516 may be repeated as desired.

Otherwise, once it is determined that the operator has attained the requisite maturity level or skill level, the COSSA 100 may perform step 518 where underlying functionality of the software may be modified. Substantially concurrently with step 518, the COSSA 100 may modify one or more software interfaces and update modification thresholds as required as shown in step 520.

Next, as illustrated in step 522, the COSSA 100 may become aware of the operator's desire to end the present session. As further illustrated in step 524, the COSSA 100 may be programmed to store the operator's profile before performing step 526 where the underlying software application is terminated. Otherwise if the query of step 522 results in a negative response (i.e., the operator cancels the request to terminate the session or otherwise indicates that the session is to continue) as illustrated by the negative flow-control arrow exiting the query of step 522, steps 512 through 520 may be repeated throughout the remainder of the present session.

It is significant to note that process descriptions or blocks in the flow chart of FIG. 5 should be understood as representing modules, segments, or portions of software code that include one or more executable instructions for implementing specific logical functions or steps in the method for modifying a software application 500 that may be practiced by the COSSA 100. Alternate implementations are included within the scope of the preferred embodiment of the COSSA 100 in which functions may be executed out of order from that shown or discussed, including substantially concurrently or in reverse order, depending on the functionality involved, as would be understood by those reasonably skilled in the art of the present invention.

It should be emphasized that the above-described embodiments of the COSSA 100 are merely possible examples of implementations, merely set forth for a clear understanding of the principles and teachings of the present disclosure. Many variations and modifications may be made to the above-described COSSA 100 without departing substantially from the spirit and principles thereof. All such modifications and variations are intended to be included herein within the scope of this disclosure and protected by the following claims.

What is claimed is:

1. A method for modifying a software application, comprising:
    identifying the operator of the software application;
    acquiring an operator profile responsive to the identified operator, wherein the operator profile includes a skill level value for the identified operator with regard to the software application;
    setting a threshold value;
    monitoring the identified operator's use of the software application to aid in determining the skill level for the identified operator;
    automatically modifying the functionality of the software application when the threshold value is exceeded by the skill level value of the identified operator;
    automatically modifying an appearance of the functional interface when the threshold value is exceeded by the skill level value of the identified operator; and
    displaying the modified appearance as the identified operator operates the software application.

2. The method of claim 1, wherein setting a threshold value comprises determining the number of times that a novice operator initiates a particular function offered by the software application.

3. The method of claim 1, wherein setting a threshold value comprises determining the number of times that a novice operator initiates a particular interface dialogue offered by the software application.

4. The method of claim 1, wherein setting a threshold value comprises collecting a plurality of parameters associated with the operator profile to generate a skill score.

5. The method of claim 1, wherein monitoring the operator's use of the software comprises maintaining a log of operator functional selections.

6. The method of claim 5, wherein maintaining a log of operator functional selections comprises updating the operator profile.

7. The method of claim 6, wherein monitoring the operator's use of the software comprises comparing the sum of each log entry with an associated threshold value.

8. The method of claim 1, wherein configuring a functional interface responsive to the operator profile includes modifying at least one interface associated with the software.

9. The method of claim 8, wherein modifying the at least one interface comprises adjusting the availability of a function.

10. The method of claim 9, wherein the modification comprises removing an unused functional selection from the interface.

11. The method of claim 9, wherein the modification comprises adding a previously withheld function to the interface.

12. The method of claim 1, wherein modifying the functional interface when the threshold is exceeded comprises moving functional selections to a higher-level interface within the software.

13. The method of claim 12, wherein the modification comprises the addition of a functional push-button to the higher-level interface.

14. The method of claim 13, wherein the modification comprises moving an interface activated by a pop-up menu selection to a dialogue window.

15. The method of claim 1, further comprising:
    storing the operator profile prior to responding to an operator request to terminate the software application.

16. The method of claim 1, further comprising the step of:
    analyzing a plurality of different historical indicators to determine the skill level value for the identified operator, at least one of the historical indicators based on information obtained from the monitoring step.

17. A computer based software modification system, comprising:
    means for receiving information reflective of the identity of an operator of a software application;
    means for receiving information responsive to the operator's skill level in using the software application;
    means for determining a threshold value;
    means for automatically modifying an interface associated with the software application and automatically modifying functionality of the software application responsive to when a software skill level parameter for the operator exceeds the threshold; and
    means for displaying the modified appearance as the identified operator operates the software application.

18. The system of claim 17, wherein the means for receiving information responsive to the operator's use comprises communicating with a history log containing a sum reflective of the instances that the operator has selected an associated function.

19. The system of claim 17, wherein the determining means comprises analyzing the opinions of representative users of the software application regarding familiarity with the operation of an interface.

20. An interactive software based system, comprising:
a user operable input device;
a user interface coupled to the input device, the user interface operable to receive at least one identifier associated with an operator of a software application, the user interface programmed to receive an operator profile associated with the operator;
a usage monitor coupled to an output of the user interface, the usage monitor programmed to record instances of operator function selections;
a usage logic coupled to the output of the usage monitor, the usage logic programmed to compare at least one selection threshold with an associated function selection sum, the usage logic programmed to generate an output signal indicative of a condition where the associated function selection sum exceeds the associated selection threshold; and
an interface product manipulator programmed to modify a software application interface that contains associated functional controls and functionality of the software application in response to the output signal.

21. A tangible computer-readable medium stored thereon instruction logic, comprising:
logic for identifying an operator of an associated software application;
logic for obtaining information reflective of the operator's skill level in using the software application over a current and previous operating sessions;
logic for updating the information reflective of the operator's skill level;
logic for comparing the operator's skill level with at least one threshold;
logic for automatically manipulating functionality of the software application responsive to a condition when the operator's skill level in use of the software application exceeds the at least one threshold; and
logic for automatically manipulating a software application interface responsive to a condition when the operator's skill level in use of a functional control exceeds the at least one threshold.

* * * * *

UNITED STATES PATENT AND TRADEMARK OFFICE
CERTIFICATE OF CORRECTION

| | |
|---|---|
| PATENT NO. | : 6,981,242 B2 |
| APPLICATION NO. | : 10/043806 |
| DATED | : December 27, 2005 |
| INVENTOR(S) | : Michelle R. Lehmeier et al. |

It is certified that error appears in the above-identified patent and that said Letters Patent is hereby corrected as shown below:

In column 16, line 63, in Claim 17, after "threshold" insert -- value --.

In column 18, line 3, in Claim 21, delete "medium" and insert -- medium, --, therefor.

In column 18, line 4, in Claim 21, delete "logic," and insert -- logic --, therefor.

Signed and Sealed this

Eleventh Day of August, 2009

David J. Kappos
*Director of the United States Patent and Trademark Office*